US012811252B2

(12) United States Patent
Doraciak et al.

(10) Patent No.: US 12,811,252 B2
(45) Date of Patent: Nov. 24, 2026

(54) CELL CONNECTOR AND METHOD FOR CONTACTING AT LEAST TWO GALVANIC CELLS

(71) Applicant: Mercedes-Benz Group AG, Stuttgart (DE)

(72) Inventors: Patrik Doraciak, Kirchheim (DE); Christian Elsner, Fellbach (DE); Thomas Engelhardt, Allmersbach im Tal (DE); Oliver Gustke, Remshalden (DE); Marius Schwarz, Stuttgart (DE); Dirk Steffens, Weinstadt (DE); Michael Stocker, Haigerloch (DE)

(73) Assignee: Mercedes-Benz Group AG, Stuttgart (DE)

( * ) Notice: Subject to any disclaimer, the term of this patent is extended or adjusted under 35 U.S.C. 154(b) by 445 days.

(21) Appl. No.: 18/555,394

(22) PCT Filed: Apr. 8, 2022

(86) PCT No.: PCT/EP2022/059395

§ 371 (c)(1),
(2) Date: Oct. 13, 2023

(87) PCT Pub. No.: WO2022/218845

PCT Pub. Date: Oct. 20, 2022

(65) Prior Publication Data

US 2024/0204360 A1 Jun. 20, 2024

(30) Foreign Application Priority Data

Apr. 15, 2021 (DE) ..................... 10 2021 001 982.2

(51) Int. Cl.
*H01M 50/503* (2021.01)
*B23K 26/244* (2014.01)
(Continued)

(52) U.S. Cl.
CPC ......... *H01M 50/503* (2021.01); *B23K 26/244* (2015.10); *H01M 50/516* (2021.01); *B23K 2101/36* (2018.08)

(58) Field of Classification Search
None
See application file for complete search history.

(56) References Cited

U.S. PATENT DOCUMENTS 6,614,027 B1 9/2003 Iwasawa
6,641,027 B2 * 11/2003 O'Connell .......... H01M 50/534 429/211

(Continued)

FOREIGN PATENT DOCUMENTS

CN 106207062 A 12/2016
JP 2003-223880 A 8/2003

(Continued)

OTHER PUBLICATIONS

Korean-language Office Action issued in Korean Application No. 10-2023-7032997 dated Aug. 21, 2025 with English translation (21 pages).

(Continued)

*Primary Examiner* — Colin W. Slifka
(74) *Attorney, Agent, or Firm* — Crowell & Moring LLP

(57) ABSTRACT

A cell connector for interconnecting output conductors and/or wires includes a strip-shaped element with at least five portions. A first portion forms a first half of a closure element, the second portion forms a first clamping surface, the third portion forms a deflection element, the fourth portion forms a second clamping surface, and the fifth portion forms a second half of the closure element. The third portion is configured to enable the first portion and the second portion to be folded over relative to the fourth portion and the fifth portion such that, in a folded-up state of the strip-shaped element, a portion of the first and a portion (Continued)

of the second clamping surfaces lie opposite each other and form a receptacle and, in the folded-up state, the first portion and the fifth portion can be interconnected to fix the strip-shaped element in the folded-up state.

10 Claims, 4 Drawing Sheets

(51) Int. Cl.
*B23K 101/36* (2006.01)
*H01M 50/516* (2021.01)

(56) References Cited

U.S. PATENT DOCUMENTS

| | | | |
|---|---|---|---|
| 2002/0146620 | A1 | 10/2002 | Connell |
| 2003/0111512 | A1 | 6/2003 | O'Connell et al. |
| 2009/0246620 | A1 | 10/2009 | Lee et al. |
| 2010/0173193 | A1 | 7/2010 | Kim |
| 2012/0070720 | A1 | 3/2012 | Aizawa et al. |
| 2012/0100761 | A1 | 4/2012 | Grosse et al. |
| 2016/0329543 | A1 | 11/2016 | Zhang et al. |
| 2016/0351883 | A1 | 12/2016 | Lemke et al. |
| 2020/0259158 | A1 | 8/2020 | Motohashi et al. |
| 2020/0373548 | A1 | 11/2020 | Kozuki |
| 2020/0373584 | A1 | 11/2020 | Morin et al. |

FOREIGN PATENT DOCUMENTS

| | | | |
|---|---|---|---|
| JP | 2004-55348 | A | 2/2004 |
| JP | 2006-172891 | A | 6/2006 |
| JP | 2019-67676 | A | 4/2019 |
| KR | 10-2016-0141662 | A | 12/2016 |
| KR | 10-2017-0127543 | A | 11/2017 |

OTHER PUBLICATIONS

Japanese-language Office Action issued in Japanese Application No. 2023-561285 dated Dec. 3, 2024 (3 pages).
PCT/EP2022/059395, International Search Report dated Aug. 5, 2022 (Three (3) pages).
German Search Report issued in German application No. 10 2021 001 982.2 dated Jan. 3, 2022, with Statement of Relevancy (Nine (9) pages).
Chinese-language Office Action issued in Chinese Application No. 202280027639.1 dated May 21, 2026 with English translation (28 pages).

* cited by examiner

CELL CONNECTOR AND METHOD FOR CONTACTING AT LEAST TWO GALVANIC CELLS

BACKGROUND AND SUMMARY OF THE INVENTION

The invention relates to a cell connector for interconnecting at least two output conductors and/or wires composed of at least one substantially strip-shaped element, and to a method for contacting at least two galvanic cells by means of at least one such cell connector.

A galvanic cell, also referred to as a battery cell, is a device for converting chemical energy into electrical energy. Such a galvanic cell can also be used to supply mobile devices with electrical energy. In this case, a wide variety of designs of galvanic cells are known from the general prior art, as are battery modules which consist of a plurality of interconnected galvanic cells. Thus, individual galvanic cells can be connected in series so as to increase a voltage delivered by the galvanic cells. Several individual galvanic cells or galvanic cells connected in series can also be connected in parallel to increase a capacitance of a battery module consisting of a plurality of galvanic cells. An electrical interconnection of individual galvanic cells takes place via corresponding contacting elements. Aluminium or copper output conductors are used for this purpose, in particular in the case of so-called pouch cells.

The output conductors are welded together for a robust connection. Such a connection requires a minimum cross-sectional area, since comparatively high currents are transmitted via the output conductors and thus also a corresponding connection point. If a cross-section is too small, the connection point can heat up to such an extent that the individual components of a pouch cell and/or of a battery module risk being damaged or destroyed. In order to maintain a high level of process safety when making the welded connection between several output conductors, a number of challenges must be overcome. For instance, it is necessary for two output conductors to be connected to lie on top of each other over as a large an area as possible, since gaps between the output conductors can continue to exist after the output conductors have been welded together if the two output conductors do not make contact. Thus, the output conductors to be connected are often pressed together by means of sprung clamping fingers, clamping frames or the like prior to a welding process in order to compensate for a gap between the output conductors. A cell frame is often used as a counter-bearing. Owing to tolerances when bending the output conductors or stacking the galvanic cells, due to the galvanic cells slipping during transport and due to an incorrectly adjusted clamping force of a clamping device, gaps can nevertheless be formed between the output conductors to be connected. The clamping force cannot be chosen to be arbitrarily high, since a stability or strength of the cell frame imposes limits on a maximum clamping force.

A first output conductor of a pair of output conductors to be welded typically comprises an aluminium or an aluminium alloy and the other output conductor comprises copper or a copper alloy. This means that a materially bonded connection has to be created between two different materials. The proper choice of and adhering to the correct welding parameters is thus particularly challenging. For instance, there is a high risk of welding through the output conductors into the cell frame. In a parallel connection, several galvanic cells are interconnected in parallel, several layers of output conductors are welded together, as a result of which tolerances and stacking errors can add up.

Output conductors of pouch cells are typically connected by means of laser welding. Other welding methods such as ultrasonic welding can also be used; however, these are associated with specific disadvantages. For example, ultrasonic welding requires access to the workpieces to be welded from both sides and a high space requirement for clamping the workpieces. Ultrasonic welding systems therefore end up being comparatively large. In addition, electrodes for welding wear out. Furthermore, the output conductors to be connected can stick to the welding electrodes.

It is also known to connect several galvanic cells in parallel by means of a so-called cell connector. The cell connector is, for example, a metallic strip-shaped element. If the galvanic cells to be connected have a height offset to each other, the cell connector lies obliquely on the output conductors to be connected auf, resulting in merely a linear contact or contact only at certain points between cell connector and output conductors exists. This leads to a reduction in the cross-section of an electrical contact of the galvanic cells to be connected. To compensate for such a height offset, such a cell connector can be bent at least along one portion. There creates the problem, however, that the cell connector must be positioned precisely in order to be able to produce a weld seam with sufficient quality. The more cells are to be connected with a cell connector, the more serious the problems resulting from the height offset can be. For instance, the height offset of individual cells can end up being so large that there is an air gap between output conductors and cell connector. It is also known to provide openings in the cell connector to guide the output conductors through. However, this requires the output conductors to be threaded through the cell connector and leads to a mechanical stress on the output conductors, as a result of which these can be damaged. There is also the danger that laser radiation impinging on the galvanic cells to be contacted. To avoid this, stricter requirements are placed on positioning the galvanic cells or output conductors to be connected and cell connectors in a laser welding machine.

Furthermore, a method for contacting electrical terminals with battery output conductors is known from U.S. Pat. No. 6,641,027 B2. In many electronic devices, a battery is connected to electrical circuits of the electronic device by welding or soldering. Because the installation space available within the electronic device is limited, however, it is however to access the corresponding welding or soldering sites. The method disclosed in the publication describes the forming of metallic strips on output conductors of a battery cell, which can then be contacted more easily with other current-conducting components or electrical terminal due to a larger surface area and better accessibility. For this purpose, a metal strip is laid flat onto each output conductor and bent around the latter, so that the metal strip surrounds the output conductor as much as possible. The layered structure composed of output conductor and metal strip that is produced thereby is then clamped in an ultrasonic welding system and the individual layers are connected by means of ultrasonic welding. Subsequently, the layered structure fixed by welding is cut to size.

The present invention is based on the object of specifying a cell connector for interconnecting at least two output conductors and/or wires, using which the output conductors or wires to be connected are reliably aligned with one another, so that a particularly reliable weld connection can be established between the output conductors and/or wires to be connected with a reduced effort. Another object of the present invention is to specify a method for contacting at least two galvanic cells by means of at least one such cell connector.

According to the invention, a cell connector for interconnecting at least two output conductors and/or wires composed of at least one substantially strip-shaped element has at least five portions disposed one behind the other in a longitudinal direction on the strip-shaped element. In this case, a first portion forms a first half of a closure element, a second portion forms a first clamping surface, a third portion forms a deflection element, a fourth portion forms a second clamping surface and a fifth portion forms a second half of the closure element. The third portion is designed to enable the first and the second portions to be folded over relative to the fourth and fifth portions about a folding axis extending through the third portion in a width direction extending orthogonally to the longitudinal direction. This allows the strip-shaped element to be converted into a folded-up state in which at least a portion of the first and the second clamping surfaces are substantially opposite each other in a thickness direction extending orthogonally to the longitudinal and width directions, and thus form a receptacle for the output conductors and/or wires. The first and the fifth portions can be connected to each other in the folded-up state of the strip-shaped element in order to fix the at least one strip-shaped element in the folded-up state.

Using the cell connector according to the invention, the output conductors and/or wires to be connected can be aligned and fixed to one another in a particularly reliable manner, which increases process safety in a welding process for the materially bonded connection of the output conductors and/or wires. Thus, by folding up the at least one substantially strip-shaped element, referred to in the following as closing, the output conductors and/or wires to be connected are pressed together, as a result of which stacking tolerances are compensated for. If the at least one substantially strip-shaped element is closed, the output conductors and/or wires to be connected are fixed and can no longer move relative to one another and thus detach from one another, even during transport to a welding station. In the folded-up state, the at least one substantially strip-shaped element completely surrounds the receptacle in a circumferential direction. Thus the fourth portion or the second clamping surface forms a substrate or a base for a laser welding process, which makes welding through the output conductors and/or wires more difficult. The second portion or the first clamping surface is disposed in a laser welding process between the output conductors and/or wires to be connected and a laser light source and thus represents a repository for material. It is therefore possible to likewise melt the second portion and to integrate it in a materially bonded connection between the output conductors and/or wires to be connected. This makes it possible to fill in any potential gaps. By an appropriate material selection, the resulting welded connection can also be alloyed in a targeted manner.

In addition, the manufacturing effort for contacting several galvanic cells via the output conductors can be reduced through use of the cell connector according to the invention. This eliminates the need for a complicated adjustment of the clamps used to press the output conductors to be connected together. By using the cell connector according to the invention, the output conductors to be connected are pressed onto each other particularly easily and reliably. This also allows different cell geometries to be connected to each other in a flexible manner, since it is not necessary to modify clamping equipment used for pressing the output conductors. Accordingly, a laser cabin that is flexible in terms of type and variant is conceivable. This also reduces the programming effort of the laser welding machine used to weld the output conductors and/or wires to be connected. Resulting weld seams can also be inspected more easily, since they are no longer concealed by elaborate clamping equipment. In addition, the cell connector according to the invention can be manufactured particularly easily and cost-effectively. For instance, the cell connector is a simple sheet metal bent and stamped part. According to an advantageous embodiment, the cell connector according to the invention can also be cut out of a metal sheet.

One advantageous development of the cell connector provides that the third portion comprises at least one perforation, a hinge and/or an elastic material comprises and/or is profiled at least in sections. The third portion serves to enable deflection or bending of individual portions of the cell connector in order to close or to bring the at least one substantially strip-shaped element into the folded-up state. By introducing perforations into the third portion, a flexural rigidity of the third portion is reduced, whereby the substantially strip-shaped element can be bent around the folding axis particularly easily. The perforations can be of any design. For example, they are one or more rectangular punched-out holes. The punched-out holes can have any shape, however. For instance, the punched-out holes or perforations can also be oval, circular or in the shape of any polygon. Additionally or as an alternative to the perforations, a hinge can also be integrated into or form the third portion. By means of a two-part hinge, it is possible to form the cell connector by interconnecting at least two substantially strip-shaped elements. In this case, the first substantially strip-shaped element comprises the first and second portion and a second substantially strip-shaped element comprises the fourth and fifth portion. By way of example, the third portion can also have or be formed by the film hinge. Additionally or alternatively, the third portion can also comprise an elastic material. For example, the third portion can comprise rubber, for example an elastomer. An elastic material is particularly easy to bend, stretch or compress, meaning that the at least one substantially strip-shaped element can be converted into the folded-up state particularly easily. A joint can also be integrated into or form the third portion. Additionally or alternatively, the third portion can also be profiled. For example, the third portion can be shaped like an accordion or a bellows-type enclosure around a joint of an articulated bus. This makes it even easier to bend or deflect the individual portions of the at least one strip-shaped elements. The profiling can be designed in any way, having in particular any orientation in the third portion. For example, the profiling preferably extends in the longitudinal direction. This ensures a certain minimum flexural rigidity in the width direction and reduces a flexural rigidity around the folding axis. Thus, the at least one substantially strip-shaped element can be converted into the folded-up state particularly easily, with tilting of the opposing portions being prevented or reduced. This can ensure that in folded-up state, the second and fourth portions or the first and second clamping surfaces stay aligned as parallel as possible to each other, which increases reliability when pressing on the output conductors and/or wires to be connected.

In accordance with a further advantageous embodiment of the cell connectors, the first portion and the fifth portion are designed to enter into a form-fit connection, in particular by bending, crimping, rolling or clinching at least one of the portions; and/or the first portion and the fifth portion are designed to enter into a force-fit and/or material connection, in particular by riveting, screwing, welding and/or adhesive bonding the portions. As a result, the first and the fifth portions can be particularly reliably fixed. Unintentional opening of the at least one substantially strip-shaped element out of the folded-up state can thus be reliably prevented. In particular, the first and the fifth portions have a corresponding matched geometry, meaning that they can be connected particularly easily. By way of example, the first portion can be designed as a tab and the fifth portion as a pocket for receiving the tab. Thus, the tab can be bent into the pocket whereby the first and the fifth portions can be interconnected particularly easily. In addition, this connection can then be secured by crimping, for example. It is also possible to secure a form-fit connection between the first and fifth portion, for example by soldering the two portions. In general it is also conceivable to fix the at least one substantially strip-shaped element in the folded-up state by putting an additional tensioning means over it or fastening the latter in some other way. For example, a comparatively narrow rubber band can be put over a substantially strip-shaped element in the folded-up state A heat-shrink tube can also be used for this purpose, for example.

Another advantageous embodiment of the cell connector provides that the second portion has a recess extending completely in the thickness direction through the second portion to form a welding window, in particular a substantially rectangular recess, wherein a longer edge of the recess extends in the longitudinal direction. By introducing the recess into the second portion or the first clamping surface, a laser of a laser welding machine can directly access the output conductors and/or wires to be connected. There is therefore no need to weld through the second portion or the first clamping surface. As a result, thermal stress on the elements to be connected is reduced. In addition, higher welding speeds and/or a lower laser power can be enabled. In addition, a resulting weld seam is visually easier to control. As the recess or the welding window in particular extends substantially in the longitudinal direction, a long edge of the recess coincides with a preferably selected weld seam direction. It is also conceivable to interrupt the recess so that individual portions of a resulting weld seam can be alloyed with a material of the substantially strip-shaped element. In this way, the conductivity and/or mechanical load strength of the weld seam can be adjusted in a more targeted manner. Like the perforations introduced into the third portion, the recess for forming the welding window can also be made by punching the recess in the second portion, for example. However, it is also possible to cut the recess out of the second portion, for example by means of a laser beam or water jet.

In accordance with a further advantageous embodiment of the cell connector, at least two strip-shaped elements disposed parallel to each other in the longitudinal direction are connected via at least one web extending from the second and/or from the fourth portion in the width direction away from the strip-shaped element and extending in the longitudinal direction. By means of such a cell connector, individual galvanic cells and/or cells connected in series can be connected in parallel particularly easily and reliably. The web can have any shape. In particular, it extends in the longitudinal direction over a complete length of the second and/or fourth portion. This increases the cross-section of the web as viewed in the width direction, whereby a thermal load on the web due to comparatively high currents can be reduced. In particular, the web has the same material thickness as the other portions of the substantially strip-shaped elements when viewed in the thickness direction. This makes it particularly easy to manufacture a corresponding cell connector, It can also be punched or cut out of a metal sheet.

Another advantageous embodiment of the cell connector provides that the web has at least one perforation, wherein in particular the web has a smaller thickness in the thickness direction than the substantially strip-shaped element and/or the web is corrugated (undulated/wavy/crimped) in the width direction. This makes it even easier to compensate for the height offset of galvanic cells disposed next to one another and connected by the cell connector according to the invention. The perforations introduced into the web allow the individual substantially strip-shaped elements to be easily moved relative to each other in the thickness direction. A corresponding stiffness of the web can be further reducing by reducing a thickness of the web in the thickness direction. Also, a cross-sectional shape of the web viewed in the longitudinal direction can have a corresponding contour, for example the cross-section can be undulated to more easily compensate for a height offset between individual substantially strip-shaped elements of a cell connector in the thickness direction.

In accordance with another advantageous embodiment of the cell connector, at least one substantially strip-shaped element has a connecting flange extending in the longitudinal direction and extending in the width direction away from the second portion and/or fourth portion for contacting the strip-shaped element with a current-carrying component above the substantially strip-shaped element. Using the connecting flange, simple contacting of the cell connector according to the invention is possible, for example with a current contact rail. This also makes it particularly easy to interconnect several battery modules or cell blocks. Like the first or fifth portion, the connecting flange can have a shape specially adapted to certain installation situations or geometric situations. For example, one or more through holes can be made in the connecting flange, to enable the connecting flange to be screwed to the current contact rail for example. In this case, current can flow through a screw that is passed through a through hole. In general it is conceivable that any form-fit, force-fit and/or material connection is made between at least one connection flange and at least one current-conducting component above it. For example, the connecting flange can be welded or riveted to the current contact rail. A connecting flange is advantageously comprised of a substantially strip-shaped element of a cell connector comprising several such elements that is located on an edge.

A further advantageous embodiment of the cell connector provides that in order to increase a contact pressure, acting in the thickness direction, of the first and second clamping surfaces on the output conductors and/or wires disposed in the receptacle, the second portion is curved at least in sections in the thickness direction when the at least one substantially strip-shaped element is in the folded-up state, and/or at least one half of the closure element has a contour extending in the thickness direction in the connected state of the closure element. The output conductors and/or wires to be connected are preferably pressed together with a comparatively high contact pressure to fix them particularly reliably to each other. By curving the second portion, this contact pressure is increased by a spring effect of the second portion that results from the curvature. The entire second portion can be curved or have individual curvatures at least in sections. The individual curvatures can have the same or different radii of curvature. In addition or as an alternative to the curvature of the second portion, one or both halves of the closure element can also have contours extending in the thickness direction. These can have any cross-sectional shape. For example, they can be cone-shaped or pyramid-shaped peaks. At least one half of the closure element can also be undulated in sections in the thickness direction. Due to the contouring, it is necessary to fold the first and second portions further around the folding axis until it is possible to close the first and fifth portions. As a result, the distance between the first and second clamping surfaces is reduced in the thickness direction which increases a contact pressure on the output conductors and/or wires located in the receptacle.

The at least one substantially strip-shaped element is preferably formed entirely from a conductive material, in particular a metal and/or a metal alloy and preferably from a metal sheet, or the at least one substantially strip-shaped element is formed at least in sections from a conductive material, in particular a metal or a metal alloy and preferably from a metal sheet and at least in sections from a current-insulating material, wherein the insulating material advantageously forms at least the fourth portion. If the at least one substantially strip-shaped element comprises a conductive material, a current flow between several output conductors and/or wires to be connected can also run through the at least one substantially strip-shaped element at least in sections. Thus, by using the at least two strip-shaped elements, a parallel interconnection of several galvanic cells, for example, can also be implemented particularly easily. If the at least one substantially strip-shaped element comprises metal or a metal alloy, then the second portion for example can also be welded on and integrated into an integral welded connection of the output conductors and/or wires to be connected.

It is also conceivable that in a cell connector composed of at least two substantially strip-shaped elements, a first substantially strip-shaped element comprises the first and second portions and a second substantially strip-shaped element comprises the fourth and fifth portions, wherein the first substantially strip-shaped element is manufactured entirely from a metal alloy and the second substantially strip-shaped element is manufactured from the insulating material. If the fourth portion, i.e., the second clamping surface, comprises the insulating material, this can act as a bath support. If, by contrast, the fourth portion also comprises metal or a metal alloy, it can also be welded into, which ensures process-safe contacting of the output conductors and/or wires.

In general, it is also conceivable that the complete cell connector is manufactured from the insulating material.

In a method for contacting at least two galvanic cells by means of at least one above-described cell connector, at least the following method steps are carried out according to the invention:

- aligning output conductors and/or wires to be connected;
- arranging the cell connector with respect to the output conductors and/or wires, so that the fourth portion is supported at least in sections, with a side facing away from the receptacle, on an enclosure of at least one galvanic cell and/or at least one output conductor and/or at least one wire rests on a side of the fourth portion facing towards the receptacle;
- folding over the first and second portion along the folding axis extending in the width direction through the third portion to bring the strip-shaped element into the folded-up state;
- closing the closure elements;
- welding the output conductors and/or wires to be connected or welding at least a portion of the cell connector to the output conductors and/or wires to be connected, in particular by means of at least one weld seam extending in the longitudinal direction, wherein laser welding is preferably used as the welding method.

The output conductor and/or wires to be connected are aligned in such a way that they touch or lie on top of each other over as large an area as possible in order to enable low-resistance contacting of the galvanic cells to be connected. The output conductors and/or wires to be connected are fixed in this state using the cell connector the according to the invention. For this purpose, the cell connector according to the invention is guided like a clamp around the output conductors and/or wires to be connected and closed. Optionally, in this case, the cell connector according to the invention can be supported on an enclosure of at least one galvanic cell or of a battery module and/or battery housing comprising the galvanic cell. Preferably, at least one output conductor and/or at least one wire lies flat on at least one of the clamping surfaces. This allows a particularly uniform contact pressure to be applied to the output conductors and/or wires to be connected. The closure element is closed by any form-fit, force-fit and/or material connection. For example, individual portion of one half of the closure element, for example a tab or a projection, can be folded over, crimped, rolled up or the like, in order, for example, to be inserted into or received by an opening or receptacle in the corresponding other half of the closure element. A closure element can be additionally fixed by riveting, screwing, soldering, adhesive bonding, or the like. Subsequently, the galvanic cells to be contacted can be transported safely without the output conductors and/or wires to be connected being able to shift or slip during transport, since the contact pressure applied to the output conductors and/or wires by the cell connector according to the invention prevents this. The output conductors and/or wires are subsequently welded. Any welding method can be used for this purpose, preferably laser welding. Because cell connector according to the invention presses the output conductors and/or wires, it is possible to create a particularly reliable welded connection.

Further advantageous embodiments of the cell connector according to the invention and of the method according to the invention also emerge from the exemplary embodiments, which are described in more detail in the following with reference to the figures.

DETAILED DESCRIPTION OF THE DRAWINGS

Figure 1:
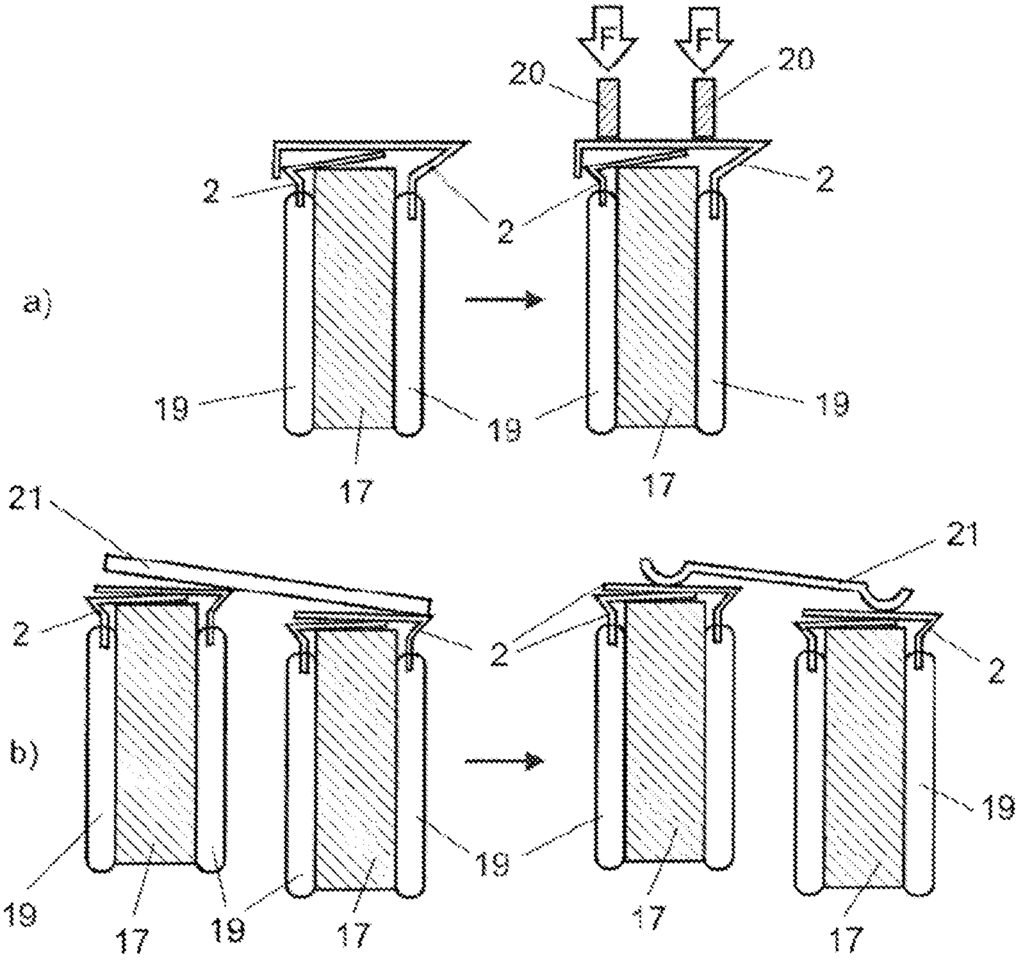
Fig.1 (Prior Art)
FIG. 1 shows a basic diagram of four known variants for interconnecting several pouch cells.
Figure 11:
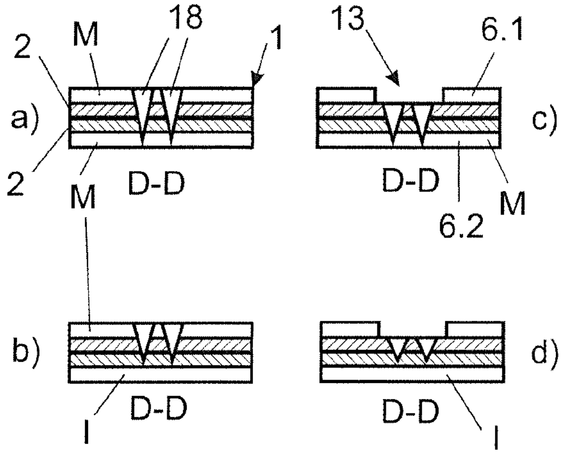
FIG. 11 shows a detail view of a section D-D shown in FIG. 10.

FIG. 1 serves to illustrate a problem that arises when interconnecting several so-called pouch cells 19 in the prior art. In this case, FIG. 1*a*) shows a problem with connecting pouch cells 19 in series and FIG. 1*b*) shows a problem with connecting several pouch cells 19 in parallel. In order to connect at least two pouch cells 19 in series with each other, output conductors 2, usually made of copper or aluminium, leading out of the pouch cells 19 are welded together. For this purpose, the output conductors 2 to be connected are advantageously in surface contact with each other over as large a distance as possible. Due to bending errors in the alignment of the output conductors 2 to be interconnected and/or component tolerances, the output conductors 2 to be connected do not extend parallel but at an angle to each other, as a result of which they do not lie flat against each other but only along a line or even only at certain points. In this case, it is not possible to create a continuous weld seam 18 as shown in FIG. 11 to connect the two output conductors 2 or this would result in a faulty weld seam 18.

To compensate for such bending errors or component tolerances, output conductors 2 to be connected are pressed against each other by applying a contact pressure F by means of a pressing tool 20. This is shown in FIG. 1*a*) on the right. Thus, the output conductors 2 lie flat on each other and can reliably welded. Typically, an enclosure 17 of at least one of the pouch cells 19 is used as a support. The enclosure 17 can be, for example, a cell frame of one of the pouch cells 19 or also a battery module housing or the like. However, it is disadvantageous that bending errors can still not be fully compensated for and thus a zero gap between the output conductors 2 to be connected cannot be achieved. In addition, adjusting a suitable pressing tool 20 requires some effort.

Another problem is the connection of several pouch cells 19 to form a parallel circuit. For this purpose, a cell connector 21 known from the prior art is typically used. If the pouch cells 19 to be connected in parallel or their enclosures 17 or also a cell frame of the pouch cells 19 have a height offset in relation to one another, this can lead to the cell connector 21 lying at an angle to the output conductors 2 to be connected. This also creates a gap, meaning that the cell connector 21 cannot be welded flat to the output conductors 2 to be connected. To compensate for this height difference, cell connectors 21 with bent portions are known. This is shown in FIG. 1*b*) on the right. However, comparatively high demands are placed on the most exact possible positioning of the components to be connected in a welding process. If more than two pouch cells 19 are to be connected in parallel, this problem can become even more complicated.

Figure 2:
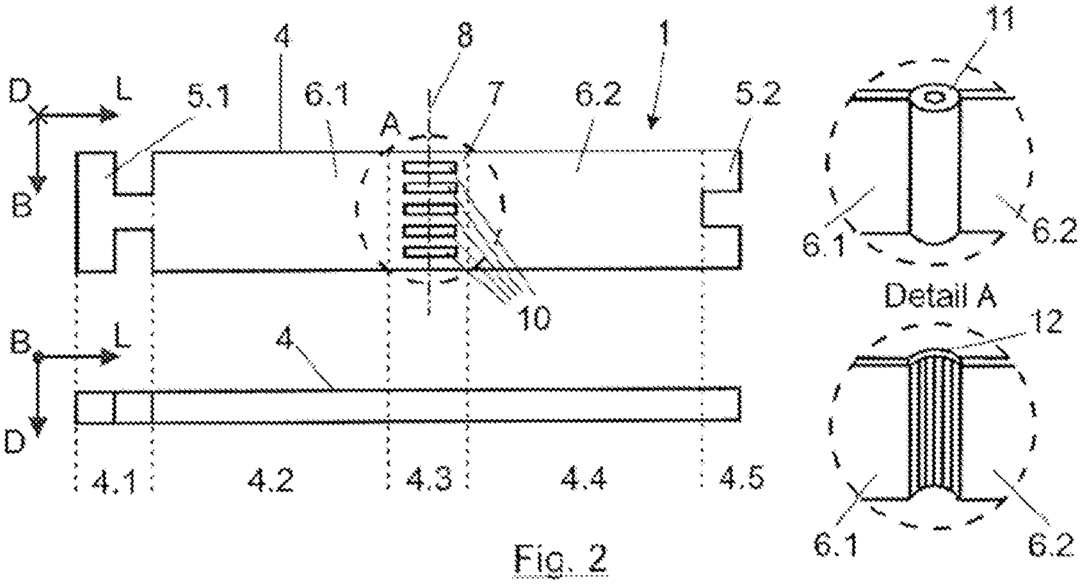
FIG. 2 shows a plan view and a side view of a cell connector according to the invention, as well as two detail views of a third portion of the cell connector according to the invention.

By using a cell connector 1 shown in FIG. 2, pouch cells 19 to be connected or contacted can be contacted particularly reliably by means of a welding method. The cell connector 1 according to the invention comprises at least one substantially strip-shaped element 4. The latter comprises five portions 4.1, 4.2, 4.3, 4.4, 4.5, which are disposed one behind the other in a longitudinal direction L on the substantially strip-shaped element 4. The substantially strip-shaped element 4 has an extension in a thickness direction D orthogonal to the longitudinal direction L and to the width direction B that is small compared to an extension in the longitudinal direction L and to width direction B orthogonal to the longitudinal direction L. The first portion 4.1 and the fifth portion 4.5 each form one half of a closure element 5.1 and 5.2. The second portion 4.2 forms a first clamping surface 6.1 and the fourth portion 4.4 forms a second clamping surface 6.2. The third portion 4.3 forms a deflection element 7. A folding axis 8 extends through the deflection element 7 in the width direction B. The substantially strip-shaped element 4 can be folded up or closed around the folding axis 8. In order to enable a comparatively simple bending or folding of the substantially strip-shaped element 4 around the folding axis 8, a flexural rigidity of the deflection element 7 is reduced by inserting perforations 10 into the deflection element 7 or the third portion 4.3. The perforations 10 can be formed by rectangular recesses as shown in FIG. 2. However, the perforations 10 can have any shape. In addition or as an alternative to the perforations 10, the deflection element 7 can also comprise or be formed by a hinge 11. This is shown in a detail view. If the hinge 11 forms the third portion 4.3, the cell connector 1 according to the invention is formed by at least two substantially strip-shaped elements 4. In this case, the respective substantially strip-shaped elements 4 can be manufactured from the same or also a different material. For example, one of the substantially strip-shaped elements 4 can be manufactured from a conductive material M, which is shown in FIG. 11, and the other substantially strip-shaped element 4 can be manufactured from a current-insulating material I. In general, however, the complete cell connector 1 can be manufactured exclusively from the conductive material M or the insulating material I. The cell connector 1 can also be manufactured from a conductive material, wherein one of the substantially strip-shaped elements 4 is manufactured from a first conductive material M, for example aluminium, and the second substantially strip-shaped element 4 is manufactured from a further conductive material M, for example copper. FIG. 2 shows a further detail view A, in which an elastic material 12 is used instead of a hinge 11 to form the third portion 4.3. This can be an elastomer for example. Any elastic material is conceivable for forming the third portion 4.3, for example vulcanized rubber, natural rubber, silicone, or the like. In particular, the third portion 4.3 or the deflection element 7 can also be profiled at least in sections. In this way a bending resistance around the folding axis 8 and around the longitudinal direction L can be adjusted in a targeted manner. The third portion 4.3 can also have a conductive material M, in particular in the form of a film hinge.

The first portion 4.1 and the fifth portion 4.5 or the respective half closure elements 5.1 and 5.2 have a matching geometric shape. In the example in FIG. 2, the first portion 4.1 forms a tab and the fifth portion 4.5 forms a pocket for receiving the tab. If the substantially strip-shaped element 4 is bent around the folding axis 8, the respective halves of the closure elements 5.1 and 5.2 are aligned with each other in such a way so that they can enter into a form fit. To fix the form-fit connection, the respective closure element halves 5.2 and 5.2 can also be joined also by an additional force-fit and/or material connection.

Figure 3:
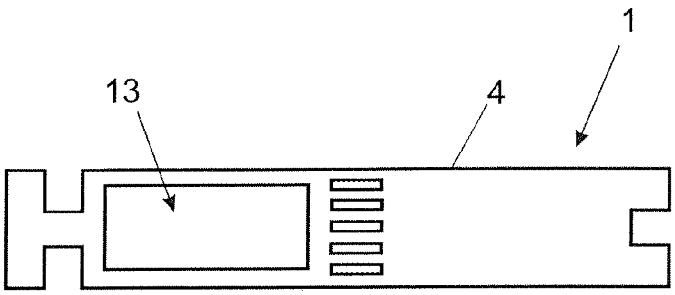
FIG. 3 shows a plan view of a cell connector according to the invention as per an alternative embodiment.
Figure 10:
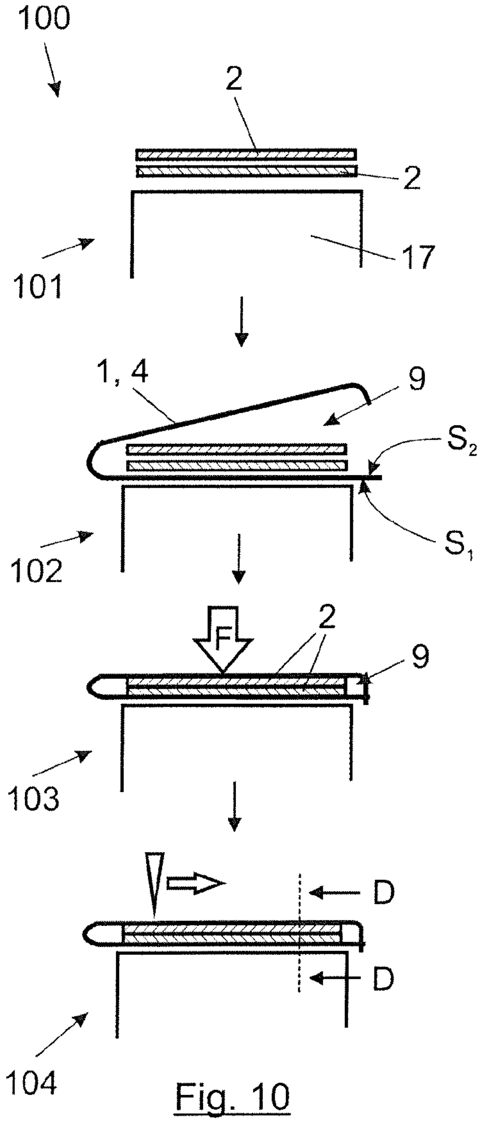
FIG. 10 shows a basic diagram of a method according to the invention for contacting at least two galvanic cells.

FIG. 3 shows a plan view of a cell connector 1 according to the invention as per an alternative embodiment. In this case, a substantially rectangular recess is made in the second portion 4.2 or the first clamping surface 6.1 to form a welding window 13. The welding window 13 can have any shape other than a rectangular shape, however. The welding window 13 provides improved accessibility for a welding tool to output conductors 2 and/or wires 3 surrounded by the cell connector 1, which is illustrated in FIGS. 10 and 11.

Figure 4:
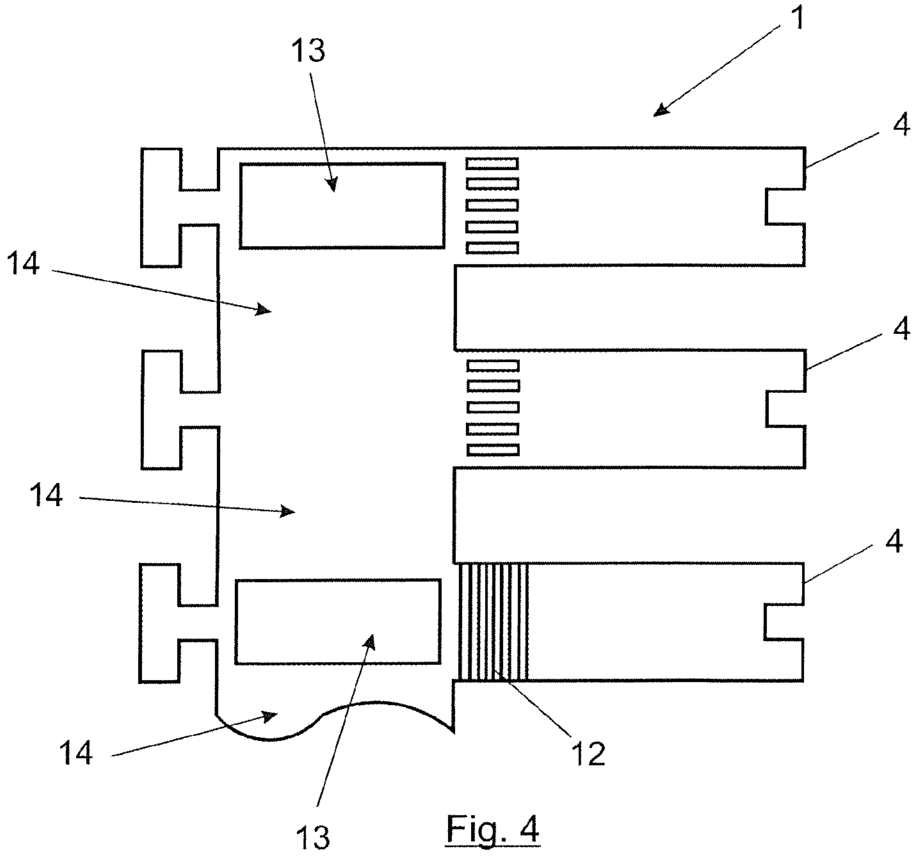
FIG. 4 shows a plan view of a cell connector according to the invention with several substantially strip-shaped elements.

FIG. 4 shows a plan view of a cell connector 1 according to the invention with a plurality of substantially strip-shaped elements 4. In this case, the plurality of substantially strip-shaped elements 4 are connected to each other via a respective web 14. In the example in FIG. 4, the web 14 is connected in each case to a second portion 4.2 of a substantially strip-shaped element 4. One or more of the substantially strip-shaped elements 4 can also have a welding window 13. It is not necessarily required that all deflection elements 7 of the substantially strip-shaped elements 4 have the same design. For instance, any number of the substantially strip-shaped elements 4 can have perforations 10, a hinge 11 and/or an elastic material 12 to form the deflection element 7. In general, however, it is also conceivable that at least one web 14 is also connected at least in sections to the fourth portion 4.4 of the substantially strip-shaped elements 4. Using the cell connector 1 shown in FIG. 4, several galvanic cells or pouch cells 19 can be connected to each other in parallel particularly easily.

Figure 5:
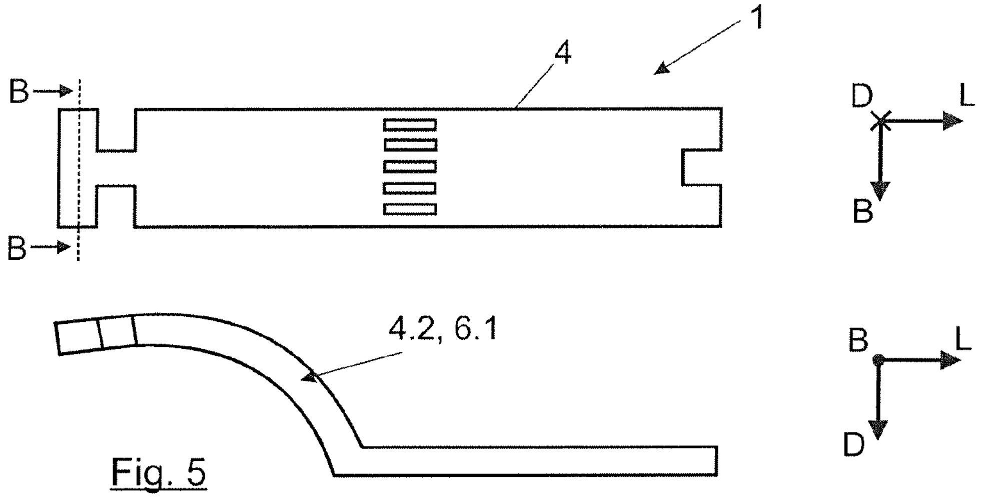
FIG. 5 a plan view and a side view of a cell connector according to the invention as per an alternative embodiment.

In the closed or in a folded-up state, the substantially strip-shaped element 4 surrounds two output conductors 2 and/or wires 3 to be connected. In this case, the substantially strip-shaped element 4 exerts a contact pressure F on the components to be connected. To increase this contact pressure F, at least one area of one of the portions of the substantially strip-shaped element 4 can be curved, as shown in FIG. 5. In the example in FIG. 5, the entire second portion 4.2 is curved about the width direction B. The resulting spring effect then allows the contact pressure F to be increased. It is also conceivable that a plurality of portions 4.1 to 4.5 of the substantially strip-shaped element 4 are curved or also have only partial curved areas.

Figure 6:
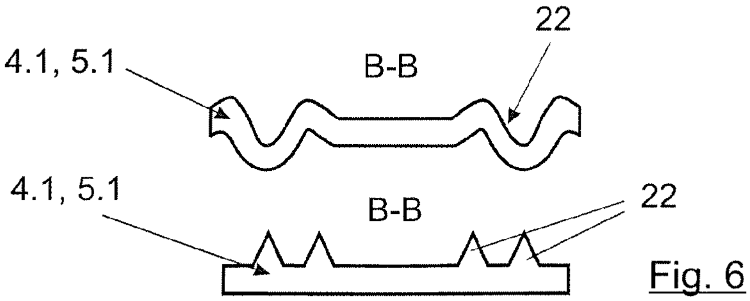
FIG. 6 shows a detail view of a section B-B shown in FIG. 5.

It is also possible to increase the contact pressure F is by contouring the first and/or second half of the closure element 5.1 and 5.2. FIG. 6 shows this in a detailed view of a section B-B shown in FIG. 5. The contouring 22 can have any design. For example, the contouring 22 can be formed by conical or pyramid-shaped frustums protruding in the thickness direction D. The half closure element 5.1 or the half closure element 5.2 can also have an undulating cross-section in the width direction B.

Figure 7:
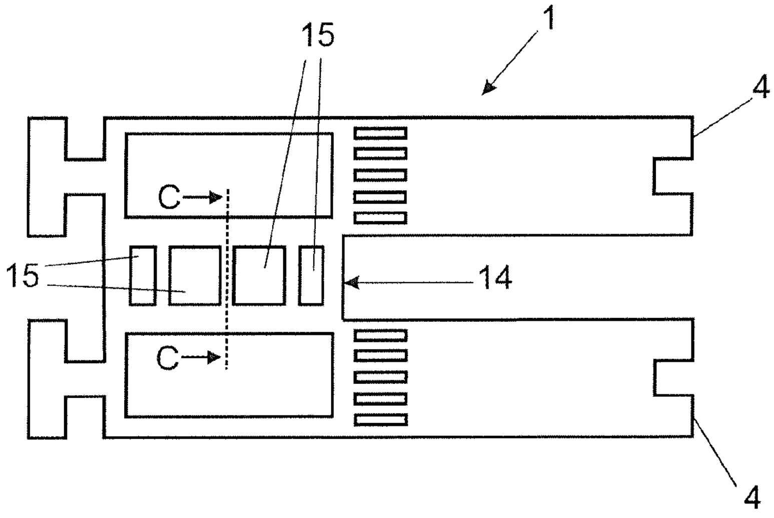
FIG. 7 shows a plan view of a cell connector according to the invention with several substantially strip-shaped elements as per an alternative embodiment.

FIG. 7 shows a plan view of a cell connector 1 according to the invention with a plurality of substantially strip-shaped elements 4 as per an alternative embodiment. In the example in FIG. 7, perforations 15 are made in a web 14 connecting two substantially strip-shaped elements 4. The perforations 15 reduce the flexural rigidity of the web 14 about the longitudinal direction L. This makes it easier to compensate for a height offset in the thickness direction D when connecting two pouch cells 19 in parallel. Here, too, the perforations 15 can have any cross-sectional shape. The perforations 15 preferably have a rectangular shape.

Figure 8:
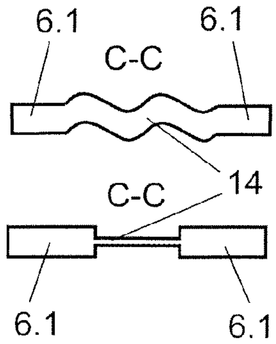
FIG. 8 shows a detail view of a section C-C shown in FIG. 7.

FIG. 8 shows a detail view of a section C-C shown in FIG. 7. By reducing a material thickness in a portion of the web 14 having material, the flexural rigidity of the web 14 can be adjusted to a desired value in a targeted manner. The web 14 can also have a certain cross-sectional shape in the width direction B, for example an undulating cross-sectional shape.

Figure 9:
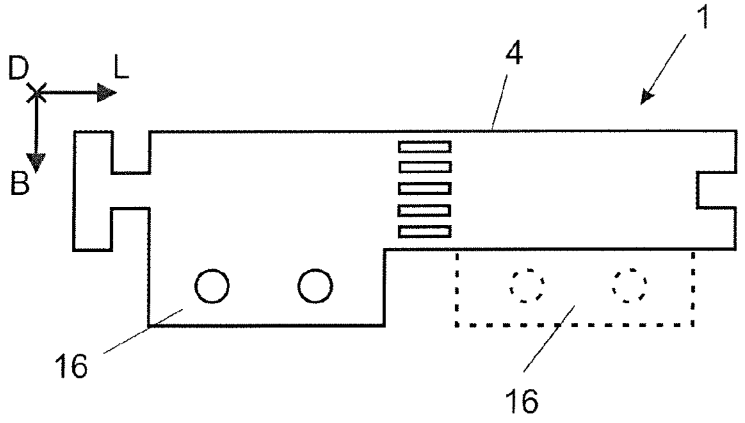
FIG. 9 shows a plan view of a cell connector according to the invention as per an alternative embodiment with a connecting flange.

FIG. 9 shows a plan view of a cell connector 1 according to the invention as per a further alternative embodiment. In the example in FIG. 9, the substantially strip-shaped element 4 has a connecting flange 16 which extends away from the second portion 4.2 and/or from the fourth portion 4.4 in the width direction B. By means of the connecting flange 16, it is possible to contact the substantially strip-shaped element 4 to a current-conducting component above it, for example a current contact rail or an output conductor of a battery module, in a simple and reliable manner. The connecting flange 16 can be connected in any way to the current-conducting component lying above with a form-fit, force-fit and/or material connection. In the example in FIG. 9, two through holes are introduced into the connecting flange 16 in order to connect the substantially strip-shaped element 4 to the current-conducting component lying above by means of a screw connection. If a metal screw is used then the current can also flow through the screw. However, the connecting flange 16 can also for example be welded, soldered or riveted to the current-conducting component lying above. Appropriate design modifications can also be made to the connecting flange 16, for example in order to plug it into the current-conducting component lying above.

FIG. 10 shows a basic diagram of a method 100 according to the invention for contacting at least two galvanic cells, for example two pouch cells 19. In the method step 101, the output conductors 2 and/or wires 3 to be connected (not shown here) are aligned with each other such that they lie on each other as flat as possible in order to create a weld seam 18 with a particularly high degree of reliability. In the method step 102, a cell connector 1 according to the invention composed of a substantially strip-shaped element 4, which can optionally be bent in advance, is pushed between the output conductors 2 to be connected and an enclosure 17 of one of the pouch cells 19 or a frame of a battery module. In the method step 103, the at least one substantially strip-shaped element 4 is folded over the folding axis 8, as a result of which the first and second clamping surfaces 6.1 and 6.2 lie flat on the output conductors 2 or wires 3 to be connected and press them onto one another with the aid of a contact pressure F. Thereby, the at least one substantially strip-shaped element 4 forms a receptacle 9 for receiving the components to be connected. In the folded-up state, the first half of the closure element 5.1 and the second half of the closure element 5.2 are connected to prevent unintentional opening of the substantially at least one strip-shaped element 4 in the folded-up state. The pouch cells 19 to be contacted are then transported to a welding apparatus. By virtue of the closed cell connector 1, the fixed components to be contacted, i.e., the output conductors 2 and/or wires 3, cannot move relative to one another. In the method step 104, the output conductors 2 and/or wires 3 are welded. Laser welding is preferably used for this.

FIG. 11 shows various sectional views through a section D-D illustrated in FIG. 10. Depending on one embodiment of the cell connectors 1 used, four different weld seams 18 are produced. FIGS. 11*a*) and *b*) show weld seams 18 through a cell connector 1 which does not have a welding window 13, and the FIGS. 11*c*) and *d*) show weld seams 18 when a cell connector 1 with a welding window 13 is used. Furthermore, FIGS. 11*a*) and *c*) show one application of a conductive material M to form the fourth portion 4.4 or the second clamping surface 6.2. Thus, the weld seam 18 can extend into the second clamping surface 6.2. According to FIGS. 11*b*) and *d*) this is not possible as the fourth portion 4.4 or the second clamping surface 6.2 is formed by a current-insulating material I. As a result, the cell connector 1 can act as a bath support. If, by contrast, the weld seam 18 extends into the fourth portion 4.4, a particularly process-safe contacting of the output conductors 2 and/or wires 3 to be connected can be ensured. In the example of FIGS. 11*a*) and *b*), the second portion 4.2 can also be melted to alloy the weld seam 18 in a targeted manner. In general it is also possible that in the embodiment in FIG. 11*d*), the complete cell connector 1 consists of the current-insulating material I. The welding window 13 nevertheless ensures that the output conductors 2 and/or wires 3 to be connected can be welded.

Figure 12:
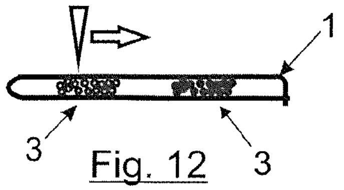
FIG. 12 shows a side view of a laser welding process for contacting two electric cables by means of the cell connector according to the invention.

FIG. 12 shows a side view of a laser welding process for contacting two electric cables by means of the cell connectors 1 according to the invention. FIG. 12 serves to illustrate that instead of at least one output conductor 2, one or more wires 3 of one or more current-conducting cables can also be fixed using a cell connector 1 according to one of the embodiments described above, in order to be able to weld them particularly reliably.

The invention claimed is:

1. A cell connector (1) for interconnecting at least two output conductors (2) and/or wires (3), comprising:

a first strip-shaped element (4), wherein the first strip-shaped element (4) has at least five portions (4.1, 4.2, 4.3, 4.4, 4.5) disposed one behind the other on the first strip-shaped element (4) in a longitudinal direction (L), wherein a first portion (4.1) forms a first half (5.1) of a closure element, a second portion (4.2) forms a first clamping surface (6.1), a third portion (4.3) forms a deflection element (7), a fourth portion (4.4) forms a second clamping surface (6.2), and a fifth portion (4.5) forms a second half (5.2) of the closure element;

wherein the third portion (4.3) is configured to allow the first portion (4.1) and the second portion (4.2) to be folded over relative to the fourth portion (4.4) and the fifth portion (4.5) about a folding axis (8) extending through the third portion (4.3) in a width direction (B) extending orthogonally to the longitudinal direction (L) such that in a folded-up state of the first strip-shaped element (4), at least a portion of the first clamping surface (6.1) and a portion of the second clamping surface (6.2) lie opposite each other substantially in a thickness direction (D) extending orthogonally to the longitudinal (L) direction and width direction (B) and thus form a receptacle (9) for the at least two output conductors (2) and/or wires (3) and, in the folded-up state of the first strip-shaped element (4), the first portion (4.1) and the fifth portion (4.5) are interconnectable in order to fix the first strip-shaped element (4) in the folded-up state.

2. The cell connector (1) according to claim 1, wherein the third portion (4.3) has at least one perforation (10) or a hinge (11) or an elastic material or is profiled at least in sections.

3. The cell connector (1) according to claim 1, wherein the first portion (4.1) and the fifth portion (4.5) are configured to enter into a form-fit connection by bending, crimping, rolling, or clinching at least one of the first portion (4.1) and the fifth portion, (4.5) or wherein the first portion (4.1) and the fifth portion (4.5) are configured to enter into a force-fit or material connection by riveting, screwing, welding or adhesive bonding the first portion (4.1) and the fifth portion (4.5).

4. The cell connector (1) according to claim 1, wherein the second portion (4.2) has a recess extending completely in the thickness direction (D) through the second portion (4.2) to form a welding window (13) and wherein a longer edge of the recess extends in the longitudinal direction (L).

5. The cell connector (1) according to claim 1, further comprising a second strip-shaped element (4), wherein the first strip-shaped element (4) and the second strip-shaped element (4) are disposed parallel to each other in the longitudinal direction (L) and are connected via a web (14) extending from the respective second portions (4.2) or from the respective fourth portions (4.4).

6. The cell connector (1) according to claim 5, wherein the web (14) has a perforation (15), wherein the web (14) has a smaller thickness in the thickness direction (D) than the first strip-shaped element (4) and the second strip-shaped element (4), and wherein the web (14) is undulated in the width direction (B).

7. The cell connector (1) according to claim 1, wherein the first strip-shaped element (4) has a connecting flange (16) extending in the longitudinal direction (L) and extending in the width direction (B) away from the second portion (4.2) or fourth portion (4.4) for contacting the first strip-shaped element (4) with a current-carrying component above the first strip-shaped element (4).

8. The cell connector (1) according to claim 1, wherein, in order to increase a contact pressure (F), acting in the thickness direction (D), of the first clamping surface (6.1) and the second clamping surface (6.2) on the at least two output conductors (2) or wires (3) disposed in the receptacle (9), the second portion (4.2) is curved at least in sections in the thickness direction (D) when the first strip-shaped element (4) is in the folded-up state and wherein at least one of the first half (5.1) and the second half (5.2) of the closure element has a contour (22) extending in the thickness direction (D) in a connected state of the closure element.

9. The cell connector (1) according to claim 1, wherein the first strip-shaped element (4) is formed entirely from a conductive material (M) or the first strip-shaped element (4) is formed at least in sections from a conductive material (M) and at least in sections from a current-insulating material (I), wherein the insulating material (I) forms at least the fourth portion (4.4).

10. A method (100) for contacting at least two galvanic cells by the cell connector (1) according to claim 1, comprising the steps of:

aligning output conductors (2) and/or wires (3) to be connected;

arranging the cell connector (1) with respect to the output conductors (2) and/or wires (3) such that the fourth portion (4.4) is supported at least in sections, with a side (S1) facing away from the receptacle (9), on an enclosure (17) of at least one galvanic cell and/or at least one output conductor (2) and/or at least one wire (3) rests on a side (S2) of the fourth portion (4.4) facing towards the receptacle (9);

folding over the first portion (4.1) and second portion (4.2) along the folding axis (8) extending in the width direction (B) through the third portion (4.3) to bring the first strip-shaped element (4) into the folded-up state;

closing the closure element; and welding the output conductors (2) and/or wires (3) to be connected or welding at least a portion of the cell connector (1) to the output conductors (2) and/or wires (3) to be connected by a weld seam (18) extending in the longitudinal direction (L) of a laser welding method.

* * * * *